(12) United States Patent
Figovsky et al.

(10) Patent No.: US 10,699,005 B2
(45) Date of Patent: Jun. 30, 2020

(54) TECHNIQUES FOR CONTROLLING AND REGULATING NETWORK ACCESS ON AIR-GAPPED ENDPOINTS

(71) Applicant: Hysolate Ltd., Tel Aviv-Jaffa (IL)

(72) Inventors: Boris Figovsky, Hadera (IL); Tal Zamir, Tel Aviv (IL)

(73) Assignee: Hysolate Ltd., Tel Aviv-Jaffa (IL)

( * ) Notice: Subject to any disclaimer, the term of this patent is extended or adjusted under 35 U.S.C. 154(b) by 231 days.

(21) Appl. No.: 15/876,675

(22) Filed: Jan. 22, 2018

(65) Prior Publication Data

US 2018/0213002 A1 Jul. 26, 2018

Related U.S. Application Data

(60) Provisional application No. 62/449,123, filed on Jan. 23, 2017.

(51) Int. Cl.
*G06F 21/53* (2013.01)
*H04L 29/06* (2006.01)
(Continued)

(52) U.S. Cl.
CPC .......... *G06F 21/53* (2013.01); *G06F 9/45537* (2013.01); *G06F 9/45545* (2013.01); *G06F 9/45558* (2013.01); *G06F 21/606* (2013.01); *H04L 61/2015* (2013.01); *H04L 63/02* (2013.01); *H04L 63/0209* (2013.01); *H04L 63/0272* (2013.01); *H04L 63/0815* (2013.01); *H04L 63/10* (2013.01);
(Continued)

(58) Field of Classification Search
CPC .... G06F 21/53; G06F 21/606; G06F 9/45558; G06F 9/45545; G06F 9/45537; G06F 2009/45591; G06F 2009/45562; G06F 2009/45595; G06F 2009/45587; G06F 2009/4557; H04W 12/0806; H04L 63/02; H04L 63/1491; H04L 63/1416; H04L 63/10; H04L 63/0272; H04L 61/2015; H04L 63/0209; H04L 63/0815; H04L 63/20; H04L 63/0263
USPC .......................................................... 726/1
See application file for complete search history.

(56) References Cited

U.S. PATENT DOCUMENTS 8,060,876 B2 * 11/2011 Smith ..................... G06F 21/57
 718/1
8,065,714 B2 * 11/2011 Budko .................... H04L 63/08
 726/4

(Continued)

*Primary Examiner* — Taghi T Arani
*Assistant Examiner* — Badri Narayanan Champeksan
(74) *Attorney, Agent, or Firm* — M&B IP Analysts, LLC

(57) ABSTRACT

A method and system for controlling access to external networks by an air-gapped endpoint are provided. The method includes identifying a type of an external network being connected, upon detection of a new network connection to the air-gapped endpoint; determining for each security zone of a plurality of isolated security zones at least one access rule to access the network, wherein the plurality of isolated security zones is operable in a virtual environment instantiated on the air-gapped endpoint; allowing a connection between a security zone and the external network based on the at least one access rule; and monitoring all traffic between the security zone and the external network to at least maintain compliance with a security policy set for the respective security zone.

18 Claims, 6 Drawing Sheets

(51) Int. Cl.
    *G06F 9/455* (2018.01)
    *G06F 21/60* (2013.01)
    *H04W 12/08* (2009.01)
    *H04L 29/12* (2006.01)

(52) U.S. Cl.
    CPC ...... *H04L 63/1416* (2013.01); *H04L 63/1491* (2013.01); *H04L 63/20* (2013.01); *H04W 12/0806* (2019.01); *G06F 2009/4557* (2013.01); *G06F 2009/45562* (2013.01); *G06F 2009/45587* (2013.01); *G06F 2009/45591* (2013.01); *G06F 2009/45595* (2013.01); *H04L 63/0263* (2013.01)

(56) References Cited

U.S. PATENT DOCUMENTS

| | | | | |
|---|---|---|---|---|
| 8,752,047 B2* | 6/2014 | Banga | ............ | G06F 21/53 718/1 |
| 8,893,261 B2* | 11/2014 | Fainkichen | ............ | H04L 67/34 726/15 |
| 9,116,733 B2* | 8/2015 | Banga | ............ | G06F 21/00 |
| 9,129,123 B2* | 9/2015 | Mooring | ............ | G06F 9/45533 |
| 9,218,489 B2* | 12/2015 | Mooring | ............ | G06F 9/45558 |
| 9,386,021 B1* | 7/2016 | Pratt | ............ | H04L 63/10 |
| 9,417,904 B2* | 8/2016 | Shin | ............ | G06F 9/45558 |
| 2008/0082543 A1* | 4/2008 | Abhishek | ............ | H04W 48/18 |
| 2011/0265168 A1* | 10/2011 | Lucovsky | ............ | H04L 63/0245 726/7 |
| 2012/0266231 A1* | 10/2012 | Spiers | ............ | H04L 63/0218 726/12 |
| 2014/0026139 A1* | 1/2014 | Takahara | ............ | G06F 11/3476 718/102 |
| 2014/0351810 A1* | 11/2014 | Pratt | ............ | G06F 9/45545 718/1 |
| 2016/0021149 A1* | 1/2016 | Maistri | ............ | H04L 65/403 348/14.08 |
| 2016/0255107 A1* | 9/2016 | Qian | ............ | H04L 63/1425 726/23 |
| 2016/0335110 A1* | 11/2016 | Paithane | ............ | G06F 9/45558 |

* cited by examiner

TECHNIQUES FOR CONTROLLING AND REGULATING NETWORK ACCESS ON AIR-GAPPED ENDPOINTS

CROSS-REFERENCE TO RELATED APPLICATIONS

This application claims the benefit of U.S. Provisional Application No. 62/449,123 filed on Jan. 23, 2017, the contents of which are hereby incorporated by reference.

TECHNICAL FIELD

The present disclosure relates generally to security systems, and more specifically to allowing air gapping security using virtual computing.

BACKGROUND

Air gapping is a security measure that involves isolating a computer from an external connection. For example, an air gapped computer is one that is physically segregated and incapable of connecting wirelessly or physically with other computers or network devices. Air gapped systems and networks are used to protect many types of critical systems, such as those utilized in industries including financial, military, government, utility facilities, and the like.

Preventing a computer or a network from accessing an external network significantly limits the productivity of users using such a computer or network. For example, an application executed on an "air gapped" computer cannot access any resource over the Internet. To do so, the user would need to use a different computer having access to the Internet.

In the related art, there are a number of solutions attempting to isolate different computing environments on a single computer. However, such solutions do not provide a complete air gapping architecture. Furthermore, such solutions often suffer from user experience issues.

As a prime example, some isolation solutions are based on virtual machine (VM) technologies. That is, VMs are containers in which applications and guest operating systems can be executed. By design, all VMs are isolated from one another. This isolation enables multiple virtual machines to run securely while sharing hardware.

Although virtual machines share hardware (e.g., CPU, memory, and I/O devices, etc.), a guest operating system running on an individual virtual machine cannot detect any device other than the virtual devices made available to the guest operating system. In various virtualization environments, a hypervisor acts as an interface between the guest operating system and the host operating system for some or all of the functions of the guests. A host operating system directly interacts with the hardware. A host operating system may be Windows®, Linux®, and the like.

Endpoints (e.g., desktop or laptop computer) configured with VM isolation do not provide a complete defense against malicious code. One vulnerability point in such virtualization environments is the host operating system. That is, hackers can exploit security vulnerabilities integrated in such operating systems to propagate malicious code to the hypervisors and then to the guest operating systems. Further, a user can install malicious software directly on the host operating systems (i.e., outside of the virtualization environment). To prevent users from installing software directly on the host operating system, such an operating system should be restricted. However, such an approach limits the user experience, as the user cannot install applications, plug-ins, change settings, and so on, with a restricted operating system.

Other isolation solutions are based on the sandboxing of critical applications executed on an endpoint. The sandboxing is achieved by running each application in a separate VM. However, this isolation can also be penetrated by hackers, as the sandboxed applications are often executed over a vulnerable host operating system which is controlled by the user and has a wide attack surface.

Another isolation solution is based on separating any browsing activity from the endpoint to eliminate malware and phishing from websites and emails. In such solutions, the browser is executed in a VM in a cloud computing platform, where all webpages are rendered in the cloud and sent to the endpoint for display therein. This solution does not defend from other applications executed in a typical endpoint. Further, such solution does not prevent a user from installing malicious software on the endpoint.

In all of the above-mentioned solutions a vulnerable point is the access to an external network (e.g., the Internet). If such network access is not controlled, the malware can be downloaded to the endpoint. Once executed on the endpoint, the malware can act as a bot and communicate with a command-and-control server, send data to an external source, and so on. Therefore, as isolation solutions still demonstrate network vulnerabilities, such solutions cannot provide a complete air-gapped endpoint.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for controlling access to external networks by an air-gapped endpoint. The method comprising identifying a type of an external network being connected, upon detection of a new network connection to the air-gapped endpoint; determining for each security zone of a plurality of isolated security zones at least one access rule to access the network, wherein the plurality of isolated security zones is operable in a virtual environment instantiated on the air-gapped endpoint; allowing a connection between a security zone and the external network based on the at least one access rule; and monitoring all traffic between the security zone and the external network to at least maintain compliance with a security policy set for the respective security zone.

Certain embodiments disclosed herein also include an air-gapped computing system comprising a network card interface; a processing circuitry; and a memory, the memory containing instructions that, when executed by the processing circuitry, configure the system to: identify a type of an external network being connected, upon detection of a new network connection to the air-gapped endpoint; determine for each security zone of a plurality of isolated security zones at least one access rule to access the network, wherein the plurality of isolated security zones is operable in a virtual environment instantiated on the air-gapped endpoint; allow a connection between a security zone and the external network based on the at least one access rule; and monitor all traffic between the security zone and the external network to at least maintain compliance with a security policy set for the respective security zone.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
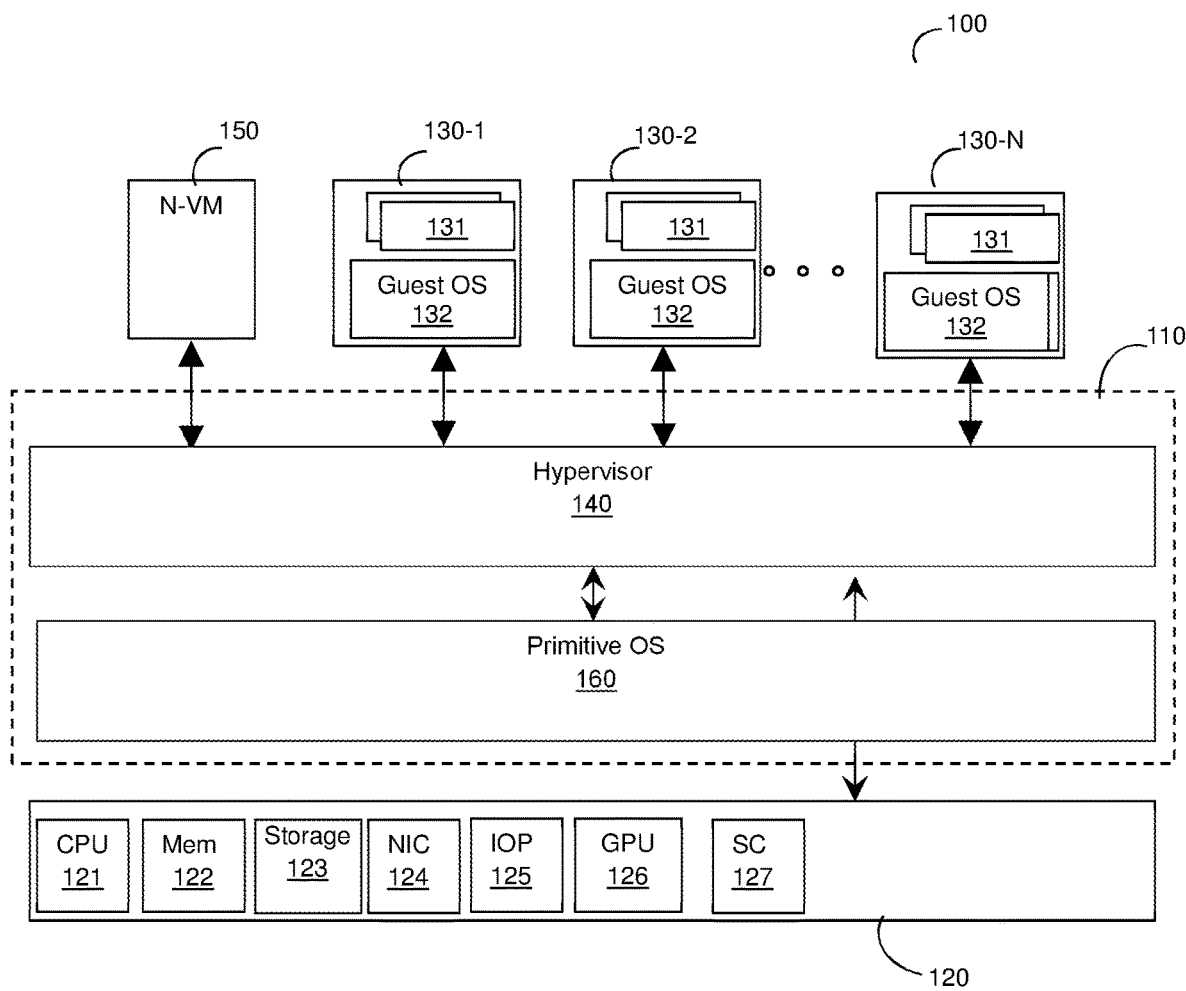
FIG. 1 is a schematic diagram of an endpoint arranged with a virtualized environment according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments, a virtualized environment designed to secure endpoints from execution of malicious code is provided. Specifically, the disclosed embodiments allow for operation of any endpoint in a virtual air-gap mode, thereby ensuring that the endpoint is isolated from unsecured resources (such as networks, external drives, and the like). The disclosed virtualized environment allows for executing multiple applications in a number of different secured zones, while providing a seamless user experience.

In an embodiment, each zone is isolated from other zones, and each application that can be accessed by a user is executed in one of a few virtualized environments. In addition, the virtualized environment does not require a full host OS to interface between the security zones and the hardware of the endpoint. As another security measure, a user of the endpoint may be prohibited from configuring any element of the underlying host environment. According to the disclosed embodiment, a network handler operable in the virtual air-gapped system is configured to control and regulate all access from and to an external network to the endpoint. To this end, only the network handler can access or provide access to a physical network interface card (NIC) in the system.

FIG. 1 shows a schematic diagram illustrating an endpoint 100 arranged with a virtualized environment 110 according to an embodiment. The endpoint 100 may be a computing device, such as a personal computer (PC) in a form factor of either a laptop or desktop.

The endpoint 100 includes hardware 120, such as can be found in a standard desktop or laptop computer. The hardware 120 may include, for example, a processing circuitry (CPU) 121, a memory (Mem) 122, a storage 123, a network interface card (NIC) 124, input/output (I/O) peripherals (10P) 125, a graphics processing unit (GPU) 126, and a sound card (SC) 127. The processing circuitry 121 may be realized by one or more hardware logic components and circuits. For example, and without limitation, a general-purpose microprocessor, a central processing unit (CPU), a multi-core CPU, a digital signal processor (DSP), and the like, or any other hardware logic components that can perform calculations or other manipulations of information. The memory 122 may be volatile (e.g., RAM, etc.), non-volatile (e.g., ROM, flash memory, etc.), or a combination thereof.

The storage 123 may be magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information. The NIC 124 allows the endpoint 100 to communicate with external networks over a wired connection, a wireless connection, or both.

The NIC 124 may transmit communication media, receive communication media, or both. For example, the NIC 124 may in a form of a modem, an integrated network interface, a radio frequency transmitter/receiver, an infrared port, a USB connection, and the like.

The I/O peripheral 125 allows connectivity to external peripherals, such as a disk drive, printers, a wireless keyboard, a pointing device, a microphone, a speaker, a docking station, and the like. The I/O peripherals 125 may allow connectivity through USB ports, PS/2 ports, Infrared ports, and the like. The GPU 126 provides connectivity to a monitor display. The sound card 127 (or audio card) provides input and output of audio signals to and from an endpoint under control of guest OS.

It should be noted that other hardware components are included in a typical hardware of an endpoint which are not illustrated herein. Such components may include, but are not limited to, a motherboard, a power source, and the like.

According to the disclosed embodiments, the virtualized environment 110 is designed to provide a complete virtual air-gapping for a plurality of security zones 130-1 through 130-n (hereinafter referred to individually as a security zone 130 and collectively as security zones 130, merely for simplicity purposes). The virtualized environment 110 is also arranged to include a hypervisor 140 controlling the security zones 130, a network handler 150, and a primitive operating system (OS) 160. In an example embodiment, the network handler 150 may be realized as a virtual machine, a software agent, and the like. For sake of simplicity, the network handler 150 would be referred hereinafter as a "networking-VM" 150 or a "N-VM" 150 or a.

Each security zone 130 is realized as a virtual machine executing a plurality of applications 131 over a guest OS 132. Each security zone 130 is configured to host applications based on their security and sensitivity levels. For example, a security zone 130 may be a corporate zone for general corporate applications, a personal zone for untrusted content and applications, a privileged IT zone for production applications, a financial zone for sensitive financial applications (e.g., SWIFT), a zone for critical infrastructure applications (e.g., SCADA), and so on.

Each security zone 130 is completely isolated from each of the other zones 130. That is, an application executed in zone 130-1 cannot access any content or applications executed in zone 130-2.

As an example, the zone 130-1 may be a trusted corporate zone (executing sensitive corporate applications) while the zone 130-2 can run applications that can access untrusted applications and resources. That is, the corporate zone 130-1 provides access to sensitive corporate resources and can be strictly locked down, while the personal zone 130-2 can provide free access to the Internet and allow the user to install and run any application.

According to the disclosed embodiments, the virtualized environment 110 provides a complete separation between the zones 130-1 and 130-2, thereby providing a complete air-gap between the zones. As will be discussed below, applications from different zones 130 are displayed on the same display, content can be copied from one zone to another (under a control of a user and a user-defined policy), and switching between zones is seamless. Thus, the virtualized environment 110 would allow improved productivity for users.

The operation of the security zones 130 is controlled by the hypervisor 140. Specifically, the hypervisor 140 is configured to instantiate a VM for each security zone 130. The applications 132 are executed in each corresponding VM. The hypervisor 140 is configured to present the zones 130, and hence the applications 131 executed therein, with a unified user experience (UX).

According to an embodiment, the hypervisor 140 is also configured to instantiate the N-VM 150. The N-VM 150 is not accessible to the user, i.e., no user applications are executed therein and no local configuration of the N-VM 150 is allowed. The N-VM 150 is configured to control and regulate access to the external networks (not shown in FIG. 1) through the NIC 124. Examples for such networks may include, but are not limited to, the Internet, a local area network (LAN), a virtual private network (VPN), a short-range network (e.g., Bluetooth®), and the like. The operation of the N-VM 150 is discussed in greater detail below.

According to the disclosed embodiments, after instantiating the VMs of the zones 130 and the N-VM 150, the hypervisor 140 is configured to virtualize the components of the hypervisor 140. That is, for each guest OS 132, the hypervisor 140 provides a limited set of virtualized hardware services. For example, when the user is in a security zone 130-1 an access to a microphone will be permitted to access the applications 131 running in that zone.

In an embodiment, the hypervisor 140 is configured to instantiate and control the VMs, as well as to virtualize hardware services to such VMs. This allows for programming the hypervisor 140 with a significantly lower number of code lines, thereby reducing the risks of vulnerabilities that can be exploited by, for example, the guest OS 132. In an embodiment, controlling the VMs (zones 130) includes enforcing security policies for each zone, as discussed in greater detail below.

Figure 2:
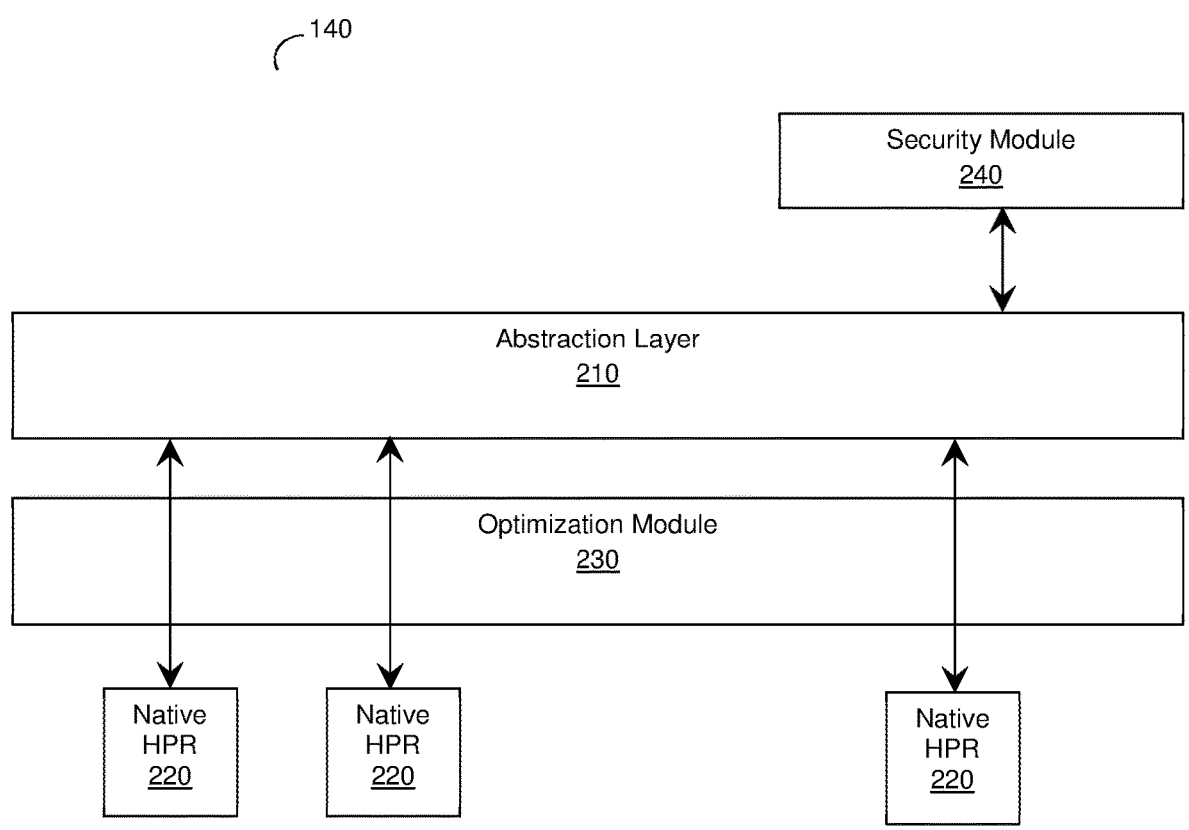
FIG. 2 is a block diagram illustrating the arrangement of a hypervisor according to an embodiment.

FIG. 2 is an example block diagram illustrating the arrangement of the hypervisor 140 according to an embodiment. The hypervisor 140 includes an abstraction layer 210 that allows the integration with a plurality of commercially available native hypervisors 220. Non-limiting examples for such native hypervisors 220 include Oracle® VM, Microsoft® Hyper-V®, and the like. The native hypervisors 220 primarily provide access to guest OSs such as Windows® 10, Windows® 7, Linux, and the like.

The hypervisor 140 also includes an optimization module 230 configured to perform optimization processes to accelerate or otherwise improve the operation of the native hypervisors 220. Such optimization processes include, but are not limited to, display optimization (3D and graphic rendering), audio optimization (playback and audio recordings), and power optimization.

In an embodiment, the audio optimization includes bypassing all emulation layers, typically performed by a standard native hypervisor when emulating a sound card (127, FIG. 1). To this end, the optimization module 230 is configured to interact directly with an application layer of a guest OS 132, so as to receive the audio signals. The optimization module 230 replays the audio signals to the audio card (in the host's hardware device). This allows for reducing latency involved by emulating the standard audio hardware, thereby improving latency and performance.

In another embodiment, the display optimization includes causing the GPU (126, FIG. 1) to render only specific windows of applications running in a VM (zone), and displaying such windows on a desktop display of another VM. To this end, the optimization module 236 is configured to provide the GPU 126 only with the regions of the application windows in the guest OS. Such regions can be deducted from the data provided by a guest OS. The optimization module 230 is further configured to capture a full screen display of the VM and instruct the GPU 126 to crop that VM's virtual display window while not rendering any region that does not belong to one of the application windows in the guest OS. It should be noted that the GPU 126 would typically show the VM's virtual display as a full screen window. This optimization allows minimal data copy of each frame, resulting in improved video performance.

In yet another embodiment, the power optimization is designed to extend the operating hours of a battery (not shown). The virtualized environment (110, FIG. 1) is designed to run multiple operating systems in multiple VMs. This can rapidly drain battery power as there is intensive usage of the processing circuitry (121, FIG. 1) and I/O devices by multiple operating systems instead of just one I/O device on a normal machine.

The optimization module 230 is configured to "freeze" all virtual machines (i.e., change their current states into an idle state) that do not have an active foreground window. In their idle state, VMs no longer consume CPU or perform I/O operations. The applications executed in the idle (frozen) VMs are displayed in their last state before the freeze operation. When the user switches the focus back to one of the frozen VMs, the optimization module 236 changes its state to that of a normal operation. It should be noted that the power optimization provides a security benefit, as a frozen VM cannot be attacked because it does not have any attack-vulnerable surface at that time.

According to the disclosed embodiments, the hypervisor 140 also includes a security module 240 configured to directly communicate with the VMs (in zones 130) and 150. That is, any request to access the hypervisor 140 is received and handled by the security module 240. In an embodiment, a request (or command) to access a resource of the hypervisor 140 is captured by the security module 240 such that the request does not reach the primitive OS 160. For example, a keyboard shortcut (e.g., Ctrl+C) would be captured and handled by the hypervisor 140. That is, the hypervisor 140 disclosed herein prevents any interfacing of a user device with the primitive OS 160. The security module 240 is configured to monitor and control the operation of other UX functions, such URL redirection and rendering of unified desktop's display. Such UX functions are discussed in greater detail below.

Returning to FIG. 1, the primitive OS 160 is configured to merely execute device drivers. For example, a display driver, a PCIe chipset drivers will be executed by the primitive OS 160. The primitive OS 160 does not and cannot access any user applications (e.g., applications installed by a user), any user-controlled OS, or any user commands. That is, the primitive OS 160 cannot execute any code which may be originated from any software installed or uploaded by the user. For example, a user accesses an unsecure website from a browser running in a personal secure zone and unintentionally downloads a malware. The malware cannot access and cannot be executed by the primitive OS 160. Further, the user cannot directly install software applications outside of the security zones 130, and specifically cannot install software directly on the primitive OS 160.

In an embodiment, the primitive OS 160 is configured to execute only pre-signed code. Thus, any malware code will not be executed by the primitive OS 160. In yet another embodiment, the primitive OS 160 cannot access the NIC 124, thus, cannot access an external network. The communication is performed through the N-VM 150. To this end, any TCP/IP activity by the primitive OS is controlled and restricted by the N-VM 150.

In an example implementation, the primitive OS 160 may implement a virtual NIC (not shown) configured with a virtual IP to allow communication with the N-VM 150. In yet another embodiment, the files of the primitive OS 160 are non-persistent, ensuring that the primitive OS 160 is reset to its original configuration after each boot of the endpoint 100. In yet another embodiment, the files of the primitive OS 160 are encrypted, so that cannot be tampered or manipulated.

In an embodiment, the primitive OS 160 may be, for example, Windows®, Mac OS®, or Linux®, that has been configured to allow only execution of drivers and to eliminate any functionality as discussed herein.

Figure 3:
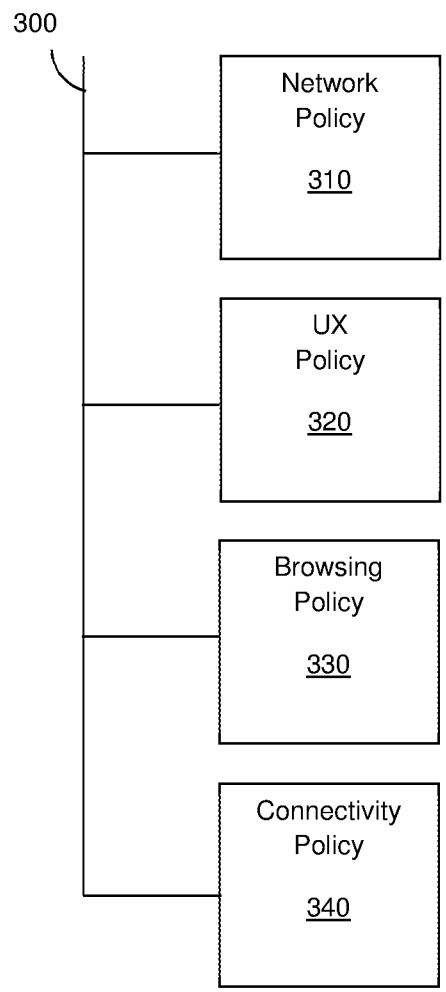
FIG. 3 is a policy diagram of a security policy structured according to an embodiment.

The N-VM 150 is configured to manage network connectivity. To this end, the N-VM 150 is configured to monitor and police all communications between the applications 131 in the different security zones 130 and external networks (not shown in FIG. 1). In an embodiment, the N-VM 150 is also configured with a network policy (e.g., the network policy 310, FIG. 3) for each security zone 130 that determines which networks can be accessed from the zone. The network policy may be defined for each application 131 in a zone or for a group of applications 131. Further, the network access may be defined with a set of permissions. As an example, a full access to a network resource, a limited access to a network resource, access is permitted only after authentication, and so on.

In an embodiment, all network access requests are routed to the N-VM 150. In response, the N-VM 150 is configured to identify from which security zone 130 (i.e., a VM) a request to access an external network has originated. The N-VM 150 allows or denies the access request based on the network policy determined for the requesting zone. As an example, requests from a personal zone to a corporate network will be blocked by the N-VM 150, while requests from a corporate network to the same network will be allowed. The network policies are pre-configured using, for example, a management server (not shown in FIG. 1) connected to the endpoint 100. The management server is discussed in detail herein below.

It should be appreciated that the primitive OS 160, the hypervisor 140, or both, do not manage the network connection, and as such do not allow or deny connections to external networks. It should be further appreciated that physical connection to the external networks are established through the NIC 124 under the control of the N-VM 150. The N-VM 150 operates in a non-persistent mode and is reverted to its initial state upon each connect or disconnect event, adding another layer of security in case the N-VM somehow becomes infected.

In an embodiment, the N-VM 150 is configured to perform network identification at various layers, e.g., a Media Access Control (MAC) layer, a Transmission Control Protocol/Internet Protocol (TCP/IP) layer, and an application layer (e.g., Hypertext Transfer Protocol Secure (HTTPS) or Secure Sockets Layer (SSL) identification). In another embodiment, the network policies can be enforced by applying access control or firewall rules at TCP/IP or application layers (e.g., layers 4 or 7 of the OSI module). In yet another embodiment, the N-VM 150 is configured to allow connections using VLAN tags or through a dynamic host configuration protocol (DHCP) proxy implemented in the N-VM 150.

It should be appreciated that the virtualized environment 110 provides a complete virtual air-gapped secured solution to applications executed in each security zone even if one or more of the zones becomes vulnerable. The design of the virtualized environment 110 assumes that all VMs, guest OSs, and applications executed in the zones 130 are not trusted. Additional layers of protection are achieved by means of the hypervisor 140, the N-VM 150, and the limited functionality of the primitive OS 160.

As an example, a corporate zone (e.g., one of the security zones 130) is infected by a malicious bot communicating with a command-and-control server. According to the disclosed embodiments, the bot cannot communicate with its command-and-control server over the Internet, as such an access attempt will be blocked by the N-VM 150. That is, the N-VM 150 may only allow access to an internal corporate network or a whitelisted set of cloud hosts, as defined in a network policy for the corporate zone, and deny access to the Internet.

In an embodiment, VMs of the security zones 130 are non-persistent. That is, the VMs are initialized to an original configuration after each boot, logoff, application event, and so on. That is, VMs infected with malware will return to their initial "clean" state after, e.g., each boot.

The operation of the security zones 130 is also regulated by additional preconfigured policies. In an embodiment, illustrated in FIG. 3, a security policy 300 is preconfigured for a security zone 130. A security policy 300 includes at least a network policy 310, a user interface (UX) policy 320, a browsing policy 330, and a connectivity policy 340. A security policy 300 is configured for each security zone 130 by, for example, a management server.

In an example embodiment, the UX policy 320 defines which user interface actions are allowed to be performed by the user in the respective zone. Examples for such actions include, but are not limited to, clipboard, printing, screenshotting, and the like. As a non-limiting example, the UX policy 320 can define if the user can copy content and paste such content in a different zone, or if content from a different zone can be pasted in the current zone. Content may include, for example, text, an image, a file and the like. The UX policy 320 may also designate what type of content can be copied, pasted, or both.

In an embodiment, cross-transfer of content between security zones is allowed only when explicitly approved by the user. This ensures that a malware cannot copy content from one zone to another.

The browsing policy 330 defines a whitelist of URLs or domain names that can be accessed from a browser executed in the respective zone. This allows, for example, blocking browsers from accessing malicious URLs when the user mistakenly browses to such URLs in the wrong security zone. In an optional embodiment, the blocked URL can be accessed and launched in another security zone which is allowed to access that URL. It should be noted that the browsing policy 330 is different from the network policy 310 in that it restricts access to certain URLs after a network established (based on the definitions) defined in the network policy. The network policy 310 is discussed in detailed above.

The connectivity policy 340 defines a set of allowed peripheral devices through wired or wireless connections. As an example, the connectivity policy 340 may define if connections through a USB plug are allowed or restricted. Restricted connectivity may limit all connections or connections to designated USB devices (e.g., printer but not Flash Drive). Examples for other wired connections may include, for example, DisplayPort, Thunderbolt™, HDMI®, PS/2, and the like. Wireless connections may include short range connections that allow wireless docking of peripheral devices (e.g., WiGig™), and the like.

Returning to FIG. 1, the disclosed embodiments allow concurrent execution of applications 131 from different security zones 130. In one configuration, one security zone (e.g., 130-1) is set as a primary zone, while another secure zone (e.g., 130-2) is set as a secondary zone. The applications and OS of the primary zone are executed in the foreground, while those of the secondary zone are executed on the background. Primarily, a user can interact with applications of the primary zone, i.e., windows of such applications are displayed on the endpoint's display.

It should be noted that the applications from the secondary zone can be displayed on the endpoint's display providing the user with the ability to interact with applications from different zones. Windows of applications from different zones are optionally marked differently.

Figure 4:
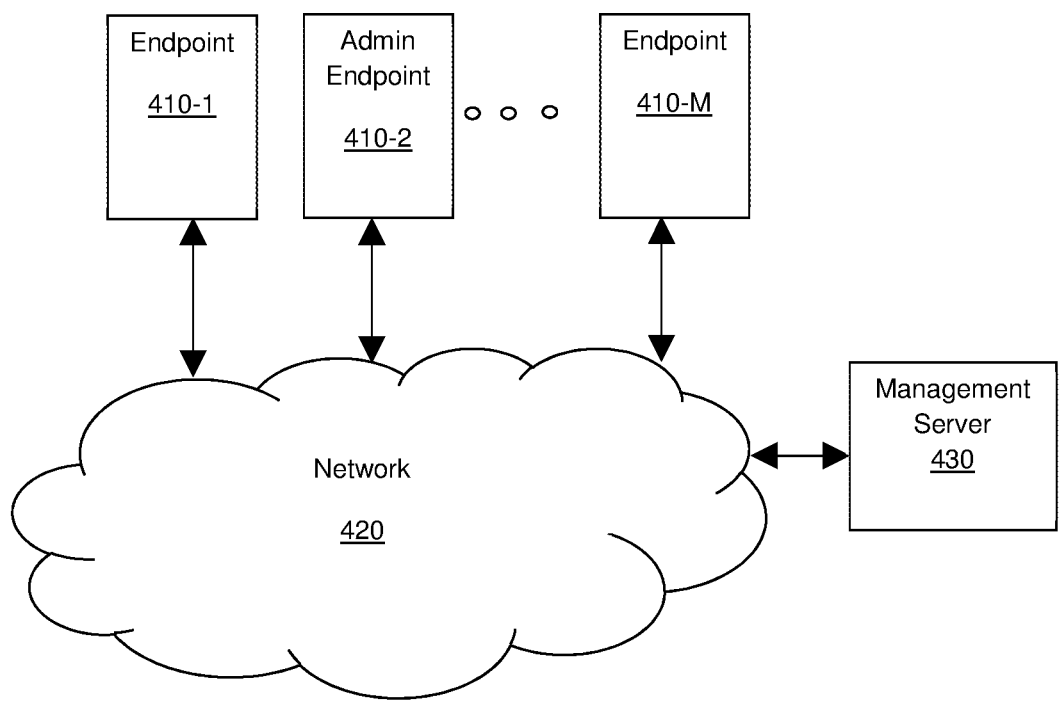
FIG. 4 is a network diagram illustrating a deployment of a management server according to an embodiment.

FIG. 4 shows an example network diagram illustrating a deployment of a management server 430 according to an embodiment. As noted above, the security zones can be configured through the management server 430. This includes defining the type of each zone, the zone's guest OS, and the applications that can be installed and executed in the zone. For example, a security zone can be defined to be a corporate zone running Linux® OS and corporate approved applications.

In another embodiment, the security policy for the security zone is also defined through the management server 430. As noted above, a security policy may include network, UX, browser, and connectivity policies.

In an embodiment, the management server 430 may include preconfigured security zones and policies that can be easily uploaded to a new endpoint. In yet another embodiment, the management server 430 can be utilized to clone security zones from one endpoint to another. Therefore, the management server 430 simplifies the process of reconfiguring new endpoints.

As shown in FIG. 4, the management server 430 is connected to a plurality of endpoints 410-1 through 410-M through a network 420. The network 420 may include a local area network (LAN), a wide area network (WAN), the Internet, and the like. In an embodiment, the management server 430 may be deployed on-premises of an organization and managed by the IT personnel of the organization. In yet another embodiment, the management server 430 may be deployed in a cloud computing platform, such as a private cloud, a public cloud, or a hybrid cloud. In such deployment, the management server 430 can serve a plurality of different tenants.

According to the disclosed embodiments, the management server 430 is a secured device. As such, only specific designated endpoints can access the management server 430. In an embodiment, the server 430 accepts connection requests from endpoints including valid certificates, e.g., SSL client certificates. Such certificates are installed only on the designated endpoints.

In the example diagram shown in FIG. 4, only the endpoint 410-2 can access the management server 430 over a secured connection (e.g., SSL connection). The endpoint 410-2 may be, for example, of an administrator. In a further embodiment, only a specific security zone (VM) within the designated endpoint 410-2 can access the management server 430.

Furthermore, when the management server 430 accesses the any of the endpoints 410-1 through 410-M, the access is performed over a secured connection. Any connection attempt made by the management server 430 to an endpoint 410-01 through 410-M is verified by a hypervisor (e.g., the hypervisor 140, FIG. 1). That is, the hypervisor verifies the certificate of the management server 430 before accepting a connection with the management server 430.

The management server 430 may be structured as a computing device including a processing circuitry coupled to a memory, a storage, and a network interface (not shown in FIG. 4).

The processing circuitry may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory may be volatile (e.g., RAM, etc.), non-volatile (e.g., ROM, flash memory, etc.), or a combination thereof. In one configuration, computer readable instructions to implement one or more embodiments disclosed herein may be stored in the storage.

In another embodiment, the memory is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry to perform the various processes described herein with respect to the operation of the management server, such as configuring security zones and policies with the endpoints.

The storage may be magnetic storage, optical storage, and the like, and may be realized, for example, as flash memory or other memory technology, CD-ROM, Digital Versatile Disks (DVDs), or any other medium which can be used to store the desired information. The storage may store the received templates of security zones, policies defined for each zone, SSL certificates, configuration of entire secured zones, and so on.

The various embodiments disclosed herein allow for operation of the air-gapped endpoint 100 with complete secured access to externals networks by means of the networking-VM (e.g., N-VM 150, FIG. 1).

Figure 5:
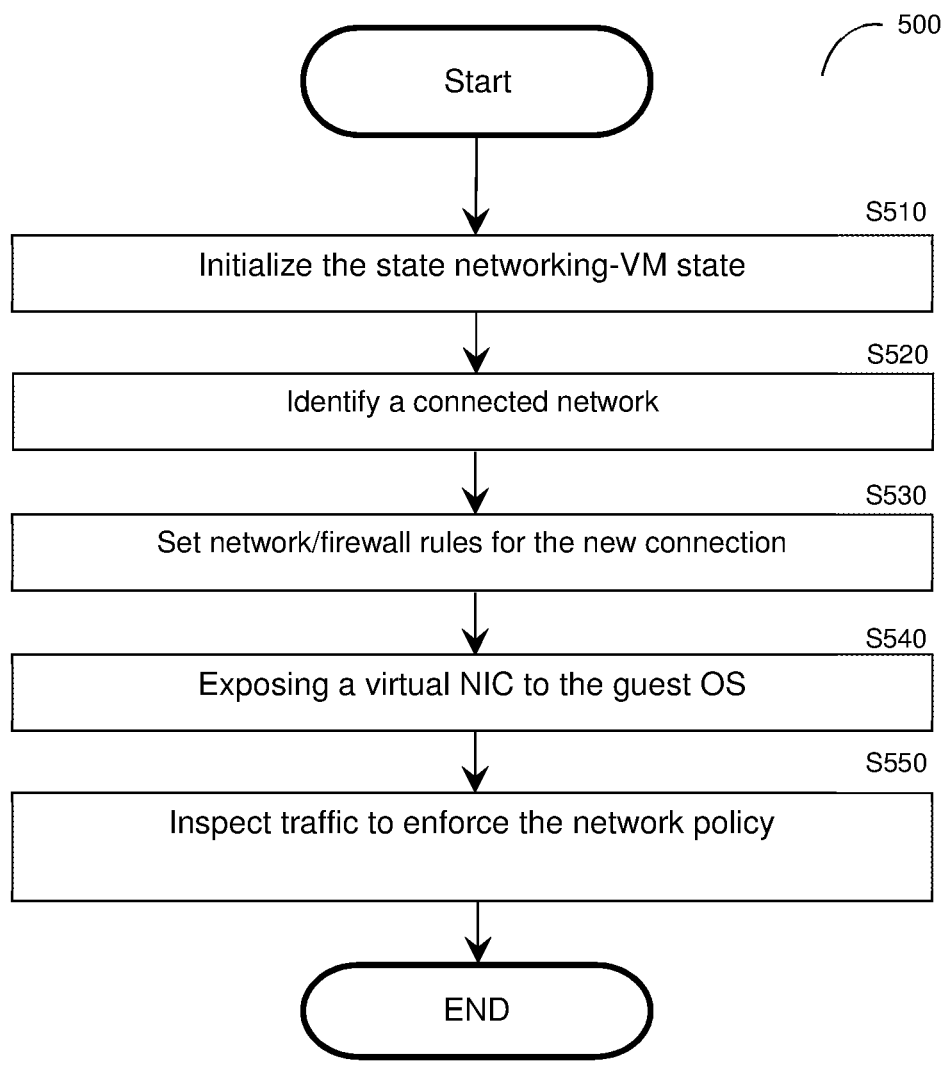
FIG. 5 is a flowchart illustrating a method for controlling and regulating network access on air-gapped endpoints according to an embodiment.

FIG. 5 is an example flowchart 500 illustrating a method for controlling and regulating network access on air-gapped endpoints according to an embodiment. The method is performed by the networking VM.

Prior to execution of the method, a plurality of security zones is created in the endpoint. The VMs are created by initiating a plurality of VMs by a hypervisor executed over a primitive OS. Each VM runs its own guest OS and a set of applications. In an embodiment, a security policy is associated with each security zone defining at least one of, or a combination of: a network policy, a UX policy, a browsing policy, and a connectivity policy. The type of the guest OS, applications and policies of each security zone can be retrieved from the management server, e.g., the server 430.

In an embodiment, an operating system (OS) booted with the endpoint may be migrated to operate as one of the guest OSs. According to the disclosed embodiments, the networking-VM is instantiated by the hypervisor when the endpoint is booted.

At S510, a state of a networking-VM is initialized. The state of the networking-VM is initialized upon every system's boot, connection to a new network, or both.

The networking-VM is configured with the network policy of each security zone. The networking-VM is a hidden VM that is responsible for managing all network activities in the air-gapped endpoint. That is, the networking-VM is isolated from the components of air-gapped endpoint, and as such does not share any virtual or physical resources with the other components. The isolation is further achieved through the operation of the networking-VM.

Specifically, one of the tasks of the networking-VM is to monitor and regulate the access of each VM in each security zone to external networks. To this end, each guest OS has its own isolated environment within the networking-VM. Therefore, if an attacker manages to run malware in the networking-VM (for example, by attacking the networking-VM through one of the guest OSs), the malware can only infect the isolated environment (dedicated to VM) and not the entire VM. This is performed using a separate kernel namespace for each of the guest OSs connected to the networking-VM.

At S520, upon detection of a new network connection, the network being connected (the "connected network") is identified. Specifically, S520 is performed whenever the physical NIC (e.g., NIC 124, FIG. 1) is connected to the network. Such a connection may be detected upon, for example, connection to a wireless local area network (WLAN), i.e., a Wi-Fi connection, connection to a LAN, the plugging in of an Ethernet cable, and so on.

The network identification would verify if the connected network is a known network. Further, for each connected network its network name, IP address, and optionally the VLAN ID are provided. The method for identifying and verifying a connected network is discussed in FIG. 6.

At S530, upon identification of the network, it is determined which security zones (i.e., VMs) can access the identified network and under which firewall rules. In an embodiment, the determination is based on the network policy. For example, if the identified network is a public Wi-Fi connection, the corporate security zone may be blocked from accessing the network. A firewall rule may define a restriction based on a destination network, a destination protocol, and an action. The destination network may be based on a subnet IP address and subnet mask. The destination protocol may be based on a protocol type, a start port, and an end port. The action may be accepting a packet/connection or dropping a packet/connection. The firewall rules may be set on a commutation protocol including, for example, IP, HTTP, HTTPS, and the like.

In one embodiment, the firewall rules may be set by a user (e.g., an administrator) when configuring the network policy. In another embodiment, some of the firewall rules are determined during a learning mode. In such a mode of operation, the networking-VM is set to learn the network connections that are being made by each security zone. The learning mode is typically set only during an initial set of the virtual environment when connections are considered to be legitimate. The learning mode may be set to a predefined time period. In the conclusion of the operation, a set of firewall rules indicating allowable connections between security zones and external networks are generated. The generated rules may be configured by a user before being added to the network policy.

In an embodiment, S530 further includes denying the primitive OS (160, FIG. 1) from directly accessing the physical network. In such configuration, all traffic from the primitive OS is directed to the networking-VM.

At S540, upon allowing a connection between a security zone and the connected network, a virtual NIC is exposed to a guest OS in the respective security zone. A virtual NIC is exposed per connected physical NIC. In an embodiment, the MAC address of each virtual NIC is the same as the corresponding MAC of the physical NIC.

It should be noted that the virtual NIC assignment does not allow the guest OS to directly access the physical NIC, but rather provides an impression that such an ability is possible. To isolate the guest OS from the physical NIC, the networking-VM implements a double network address translation (NAT) mechanism through which the traffic of the guest OS is directed. An IP address in a network access request from a guest OS (in one of the security zones) is first translated into an intermediate IP address within the networking-VM for traffic processing by the networking-VM. Then, then the intermediate IP address is translated again to an IP address of the physical NIC.

At S550, all traffic from security zones to external networks or from external networks to the security zones is inspected during execution of applications in the zones to at least maintain compliance with the security policy. To this end, all network access attempts are directed to the networking-VM, which enforces access to external networks based on the network policy.

Various techniques can be utilized to enforce compliance with the network policy. In one embodiment, the networking-VM can force traffic of a specific security zone (e.g., VM) to be tunneled through a VPN tunnel initiated by the networking-VM. For example, the VPN tunnel can be used to tunnel traffic safely into a secured corporate network or to tunnel malicious traffic from the zone (VM) outside of the corporate network, e.g., to a cloud VPN server. The VPN credentials may be statically pre-provisioned with a networking-VM or be requested from the user on-demand (e.g., via a hypervisor credentials dialog).

Alternatively or collectively, the traffic of a specific security zone (e.g., VM) can be completely blocked if, for example, malicious activity is detected. Thereby, the networking-VM or the hypervisor (140) can quarantine a VM of the specific security zone.

In an example embodiment, malicious activity can be detected by setting local server honeypots that simulate user activity. To this end, the networking-VM may be configured to create fake network entities that are only visible to the endpoint, but are not visible on any network connected to the endpoint. This is useful to deceive attackers into a local "honeypot" inside the device.

In a further embodiment, user activity from security zone is simulated as a real (human) user accessing the honeypot. Such simulation would include actions as performed by a "fake" user using, for example, the virtual keyboard and mouse of the zone (VM). The simulated activity can deceive malware executed in the security zone to believe that a human user accesses the honeypot, triggering the attacker to follow the simulated activity into the honeypot. Malware would connect to the honeypot (fake network entity) and follow the simulated user activity. The networking-VM, upon detection of access to the honeypot or any action related to the simulated activity, would trigger an alert on malicious activity. In another implementation, a snapshot of the infected security zone (with the malware) for further investigation.

In another embodiment for forcing compliance with network policy, the networking-VM can manipulate DHCP requests and replies. This ensures that the guest OS (in a security zone) would communicate with a specific network entity determined by the networking-VM. For example, the networking-VM, by manipulating the DHCP requests, can force a guest OS to communicate with a specific DNS server. To this end, the networking-VM serves as a DHCP proxy proxying between DHCP requests (from guest OS) and the actual DHCP requests sent over the network, and vice versa.

In yet another embodiment, when the networking-VM detects a large file transfer or simultaneous access to many files, such file transfer or access is blocked or paused until a confirmation is received from the user. In an embodiment, an approval dialog box is displayed to the user in a trusted host window. Malware potentially executed in one of the zones cannot view, access and/or control the dialog box or any buttons therein. Thus, only physical keystrokes or mouse clicks that have been detected would trigger the confirmation of the file transfer or access. This prevents a malware application executed in a security zone to initiate such a transfer of content without the knowledge, an approval or authorization of the user.

The method is executed as long as the endpoint operates. The networking-VM is reset to an initial state upon detection of a new physical connection to an external network.

Figure 6:
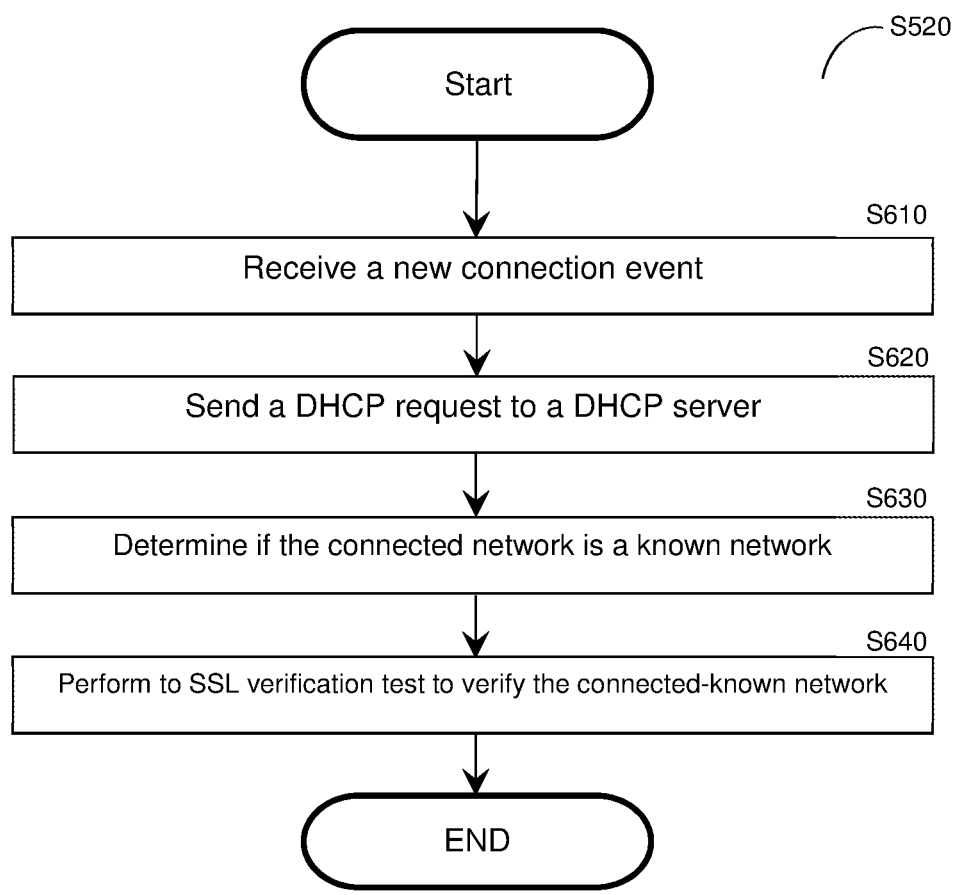
FIG. 6 is a flowchart illustrating a process for identifying external networks connected to the air-gapped endpoint according to an embodiment.

FIG. 6 is an example flowchart S520 illustrating a process for identifying external networks connected to the air-gapped endpoint according to an embodiment.

At S610, a new connection event is received. Such an event may be triggered by a physical NIC when a new connection is established.

At S620, a DHCP request is sent to a DHCP server requesting an IP address. The DHCP server typically replies with the assigned IP address as well as a subnet mask and a gateway address of the connected network.

At S630, based on the information received from the DHCP server, it is determined if the connected network is a known network. In an embodiment, a list of known networks is preconfigured by a user (e.g., an administrator) through the management server (e.g., the server 430, FIG. 4). Each known network is defined with the one or more of the following network parameters: a subnet address and mask, a gateway IP, a SSL beacon, and a VLAN ID. The SSL beacon is an IP address or a domain name of a secured server in the known network as well as the expected SSL certificate of the beacon.

At S640, each connected network determined to be known is further verified using a SSL verification test. In an embodiment, a TLS connection is established over the network with the SSL beacon. The beacon identity is verified using its SSL certificate. Verification of the SSL beacon ensures that the connected network is a legitimate known network. The SSL verification test is performed to ensure that the information provided by DHCP server have not been forged by an attacker.

Each network that passes the SSL verification test is determined as a known verified network. All other networks are considered as unknown networks. Various firewall rules are applied depending on the identity of the network (e.g., known or unknown).

It should be noted that the network identification process, described herein, ensures that even when the user mistakenly connects to an unsecured network, the networking-VM provides a secure connection, as the firewall rules depend only on the identity of the network being connected to the device.

In the embodiments discussed above, connection and authentication to a physical network is being controlled by the hypervisor or by one of the guest OS in one of the zones. However, once the connection is established, all traffic to and from the network is inspected by the networking-VM.

In an embodiment, when a network authentication is performed by a guest OS, two channels are established with the physical NIC: data and control. Over the control channel, authentication information is transferred, such as credentials, certificates, and the like. The authentication information is typically saved with one of the guest OS.

Over the data channel, all traffic to and from the external network is transferred and inspected by the networking-VM. The data channel is available upon successful authentication to the network. It should be noted that no guest OS has access to the control channel.

The process for allowing the guest OS to perform authentication to the network is particularly useful when authenticating to Wi-Fi networks, as the Wi-Fi authentication credentials may be stored and managed in one of the user VMs to keep the system compatible with existing IT practices of delivering Wi-Fi profiles to, for example, Windows® operating system. Further, this process allows for the management of authentication to all Wi-Fi networks without the need to copy credentials to the hypervisor or other guest OS.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for controlling access to networks by an air-gapped endpoint, comprising:
   identifying, by a hypervisor, a type of a network being connected, upon detection of a new network connection to the air-gapped endpoint;
   determining for each security zone of a plurality of isolated security zones at least one access rule to access the network, wherein the plurality of isolated security zones is operable in a virtual environment instantiated on the air-gapped endpoint, wherein the hypervisor prevents any interfacing of a user device with the primitive OS;
   initializing, on the air-gapped endpoint, the hypervisor for execution over a primitive operating system (OS) of the air-gapped endpoint in the virtual environment, wherein the primitive OS is configured to execute only device drivers and is restricted from executing any application received over the network;
   allowing a connection between a security zone and the network based on the at least one access rule; and
   exposing a virtual network interface card (NIC) corresponding to a physical NIC, wherein the connection to the network is through the physical NIC;
   managing the connection to the network by a networking virtual machine, wherein the networking virtual machine operates in a non-persistent mode, wherein the networking virtual machine returns to its initial clean state after each boot; and
   monitoring all traffic between the security zone and the network to at least maintain compliance with a security policy set for the respective security zone.

2. The method of claim 1, wherein identifying the type of the network further comprises:
   querying a dynamic host configuration protocol (DHCP) server to receive network parameters of the network;
   determining based on the network parameters if the network is classified as a known network; and
   in response to determining that the network is classified as the known network, verifying if the network is a legitimate known network.

3. The method of claim 2, wherein verifying if the external network is a known network further comprises:
   performing a secure socket layer (SSL) verification by verifying an SSL certificate of a known entity in the network.

4. The method of claim 2, wherein the known network is preconfigured in a list of known networks.

5. The method of claim 1, wherein the at least one access rule includes at least one a firewall rule.

6. The method of claim 1, wherein the a MAC address of the virtual NIC is the same as the a MAC address of the physical NIC.

7. The method of claim 1, wherein maintaining compliance with the security policy, further comprises performing any one of:
   tunneling traffic from the security zone through a virtual private network (VPN); and blocking traffic from the security zone.

8. The method of claim 1, wherein maintaining compliance with the security policy, further comprises:
   forcing the security zone to communicate with a specific entity in the network by modifying dynamic DHCP requests and replies.

9. The method of claim 1, wherein maintaining compliance with the security policy, further comprises:
   detecting suspicious activity related to an upload and download of files; and
   alerting on suspicious activity by rendering a dialog box requesting to approve or deny activity related to the upload and download of files.

10. The method of claim 1, wherein maintaining compliance with the security policy, further comprises:
    detecting malicious activity executed by the security zone; and
    quarantining the security zone when malicious activity is detected.

11. The method of claim 10, wherein detecting malicious activity further comprises:
    detecting malicious activity by setting at least one internal fake network entity;
    simulating user activity to direct an access to the at least one internal fake network entity; and
    tracking any access to at least one internal fake network entity that mimics the simulated user activity.

12. The method of claim 1, further comprising:
    creating the plurality of isolated security zones by instantiating a plurality of corresponding virtual machines using the hypervisor, wherein each of the plurality of security zones includes a plurality of applications executed over a guest OS; and instantiating a networking virtual machine (VM) using the hypervisor.

13. The method of claim 12, wherein the method is performed by the networking virtual machine (VM).

14. The method of claim 12, further comprising:
resetting a state of the networking VM upon detection of a new network connection.

15. The method of claim 12, wherein the primitive OS is executed by a hardware layer of the air-gapped endpoint.

16. The method of claim 12, wherein the hypervisor includes an abstraction layer, at least one native hypervisor, an optimization module, and a security module.

17. A non-transitory computer readable medium having stored thereon instructions for causing a processing circuitry to execute a process for controlling access to networks by an air-gapped endpoint, the process comprising: identifying, by a hypervisor, a type of a network being connected, upon detection of a new network connection to the air-gapped endpoint:
  determining for each security zone of a plurality of isolated security zones at least one access rule to access the network, wherein the plurality of isolated security zones is operable in a virtual environment instantiated on the air-gapped endpoint, wherein the hypervisor prevents any interfacing of a user device with the primitive OS;
  initializing, on the air-gapped endpoint, the hypervisor for execution over a primitive operating system (OS) of the air-gapped endpoint in the virtual environment, wherein the primitive OS is configured to execute only device drivers and is restricted from executing any application received over the network;
  allowing a connection between a security zone and the network based on the at least one access rule;
  exposing a virtual network interface card (NIC) corresponding to a physical NIC, wherein the connection to the network is through the physical NIC;
  managing the connection to the network by a networking virtual machine, wherein the networking virtual machine operates in a non-persistent mode, wherein the networking virtual machine returns to its initial clean state after each boot; and
  monitoring all traffic between the security zone and the network to at least maintain compliance with a security policy set for the respective security zone.

18. An air-gapped computing system, comprising: a network card interface; a processing circuitry; and a memory, the memory containing instructions that, when executed by the processing circuitry, configure the system to: identify, by a hypervisor, a type of an a network being connected, upon detection of a new network connection to the air-gapped endpoint;
  determine for each security zone of a plurality of isolated security zones at least one access rule to access the network, wherein the plurality of isolated security zones is operable in a virtual environment instantiated on the air-gapped endpoint, wherein the hypervisor prevents any interfacing of a user device with the primitive OS;
  initialize, on the air-gapped endpoint, the hypervisor for execution over a primitive operating system (OS) of the air-capped endpoint in the virtual environment, wherein the primitive OS is configured to execute only device drivers and is restricted from executing any application received over the network;
  allow a connection between a security zone and the network based on the at least one access rule;
  exposing a virtual network interface card (NIC) corresponding to a physical NIC, wherein the connection to the network is through the physical NIC;
  managing the connection to the network by a networking virtual machine, wherein the networking virtual machine operates in a non-persistent mode, wherein the networking virtual machine returns to its initial clean state after each boot; and
  monitor all traffic between the security zone and the external network to at least maintain compliance with a security policy set for the respective security zone.

\* \* \* \* \*